United States Patent
Rawal

(10) Patent No.: US 10,524,022 B2
(45) Date of Patent: Dec. 31, 2019

(54) DATA STORAGE SYSTEM WITH ADAPTIVE DATA PATH ROUTING

(71) Applicant: Seagate Technology, LLC, Cupertino, CA (US)

(72) Inventor: Kuntal Rawal, Erie, CO (US)

(73) Assignee: Seagate Technology LLC, Cupertino, CA (US)

( * ) Notice: Subject to any disclaimer, the term of this patent is extended or adjusted under 35 U.S.C. 154(b) by 220 days.

(21) Appl. No.: 15/584,845

(22) Filed: May 2, 2017

(65) Prior Publication Data
US 2018/0324503 A1 Nov. 8, 2018

(51) Int. Cl.
| | |
|---|---|
| *H04Q 3/00* | (2006.01) |
| *H04B 1/00* | (2006.01) |
| *H04B 1/44* | (2006.01) |
| *H04W 40/28* | (2009.01) |
| *H04L 12/759* | (2013.01) |
| *H04L 12/26* | (2006.01) |

(52) U.S. Cl.
CPC ........... *H04Q 3/0029* (2013.01); *H04B 1/006* (2013.01); *H04B 1/44* (2013.01); *H04W 40/28* (2013.01); *H04L 43/16* (2013.01); *H04L 45/028* (2013.01)

(58) Field of Classification Search
CPC ..... H04Q 3/0029; H04M 3/367; H04B 1/006; H04B 1/44; H04W 40/28; H04L 43/0876; H04L 45/028; H04L 45/28; H04L 43/16; H04L 45/22
See application file for complete search history.

(56) References Cited

U.S. PATENT DOCUMENTS

| | | |
|---|---|---|
| 5,355,453 A | 10/1994 | Row et al. |
| 6,601,101 B1 | 7/2003 | Lee et al. |
| 6,834,326 B1 | 12/2004 | Wang et al. |
| 6,883,065 B1 | 4/2005 | Pittelkow et al. |
| 7,200,144 B2 | 4/2007 | Terrell et al. |
| 7,631,128 B1 | 12/2009 | Sgrosso et al. |
| 7,783,779 B1 * | 8/2010 | Scales ............... G06F 9/5077 709/207 |
| 7,934,055 B2 | 4/2011 | Flynn et al. |
| 7,958,303 B2 | 6/2011 | Shuster |
| 8,352,540 B2 | 1/2013 | Anglin et al. |
| 8,775,868 B2 | 7/2014 | Colgrove et al. |
| 8,972,657 B1 * | 3/2015 | Armangau ........... G06F 3/0613 711/114 |
| 9,569,116 B1 | 2/2017 | Colgrove et al. |
| 9,588,699 B1 | 3/2017 | Colgrove et al. |
| 9,594,633 B2 | 3/2017 | Colgrove et al. |
| 9,817,607 B1 * | 11/2017 | Harvey .................. G06F 3/061 |
| 10,148,483 B1 * | 12/2018 | Lippitt .................. H04L 47/70 |

(Continued)

*Primary Examiner* — Oussama Roudani
(74) *Attorney, Agent, or Firm* — Hall Estill Attorneys at Law

(57) ABSTRACT

A data storage system can have adaptive data path routing that consists of a network controller connected to a plurality of data storage units that each have a local controller and memory. A front-end module of the network controller may direct a first data set from a first data storage unit of the plurality of data storage units via a primary data. A back-end routing module of the network controller can adapt to an amount of data accesses by transferring a second data set from a second data storage unit of the plurality of data storage units via a back-end data path.

20 Claims, 4 Drawing Sheets

(56) References Cited

U.S. PATENT DOCUMENTS

| | | | |
|---|---|---|---|
| 2004/0068591 A1* | 4/2004 | Workman | G06F 11/2089 710/58 |
| 2005/0091426 A1* | 4/2005 | Horn | G06F 3/0613 710/33 |
| 2005/0235132 A1* | 10/2005 | Karr | G06F 3/0607 711/203 |
| 2014/0040205 A1* | 2/2014 | Cometto | G06F 3/0605 707/639 |
| 2016/0117281 A1* | 4/2016 | Akaike | G06F 3/06 710/313 |
| 2017/0293428 A1* | 10/2017 | Radovanovic | G06F 12/0804 |

* cited by examiner

DATA STORAGE SYSTEM WITH ADAPTIVE DATA PATH ROUTING

SUMMARY OF THE INVENTION

A data storage system, in accordance with some embodiments, consists of a network controller connected to a plurality of data storage units that each have a local controller and memory. A front-end module of the network controller directs a first data set from a first data storage unit of the plurality of data storage units via a primary data. A back-end routing module of the network controller adapts to an amount of data accesses by transferring a second data set from a second data storage unit of the plurality of data storage units via a back-end data path.

Various embodiments arrange a data storage system with a network controller connected to a plurality of data storage units that each have a local controller and memory. A front-end module of the network controller directs a first data set from a first data storage unit of the plurality of data storage units via a primary data. The detection of a number of active data storage units in the plurality of data storage units by the network controller triggers a back-end routing module of the network controller to transfer a second data set from a second data storage unit of the plurality of data storage units via a back-end data path.

In other embodiments, a data storage system has a network controller connected to a plurality of data storage units that each consist of a local controller and memory. The network controller has a front-end routing module and a back-end routing module that respectively direct data to the plurality of data storage units via a primary data path and a separate back-end data path in accordance with a detected number of active data storage units in the plurality of data storage units.

DETAILED DESCRIPTION

Demand for increased network data storage capability has grown with the advent of cloud computing and remote data storage computing functionality. While technological strides have been made to provide greater network data capacity, the bandwidth of a network often remains a bottleneck to utilizing the capability of increased amounts of data storage. Hence, there is a continued industry and consumer interest in optimized utilization of multiple network data paths to provide heightened data access speed, particularly during large data flow situations.

Figure 1:
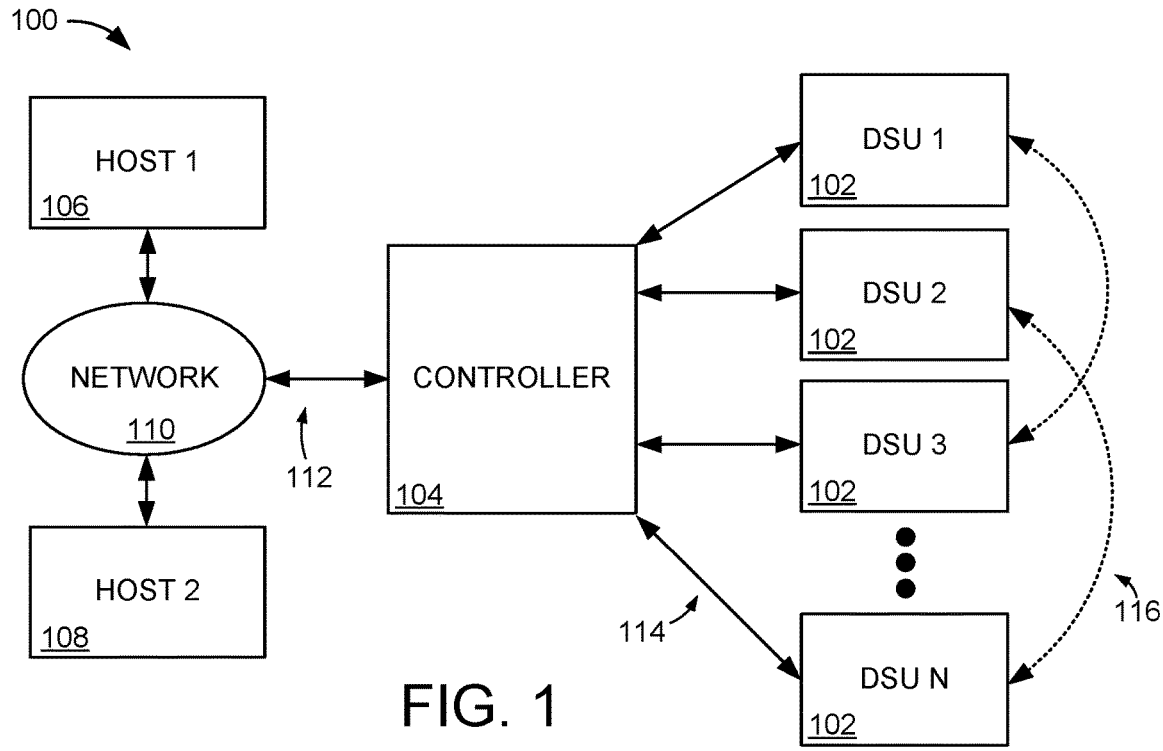
FIG. 1 is a block representation of an example data storage system arranged in accordance with various embodiments.

FIG. 1 is a block representation of an example data storage system 100 where various embodiments can be practiced. The system 100 may be any size and consist of any size number and type of interconnected computing components. In the non-limiting configuration of FIG. 1, a plurality of data storage units 102 (1-N) are each connected to a network controller 104 that receives data from first 106 and second 108 remote hosts via a wired and/or wireless network 110. The network controller 104 can treat some, or all, of the data storage units 102 as a redundant array of independent disks/devices (RAID) with configurations, such as level 0, 1, 3, 5, etc., where data is striped and/or mirrored with or without parity data to provide reliable data storage.

The network controller 104 can direct the flow of data to, and from, individual data storage units 102 as well to a group of more than one data storage units 102 to fulfill pending data access requests, such as data reads and data writes. It is contemplated that the network controller 104 can also direct data traffic in and among the data storage units 102 as part of data storage maintenance or security.

Although not required, data can flow through the data storage system 100 from remotely connected hosts 106/108 to one or more data storage units 102 or vice versa. Such flow can be characterized as being upstream 112 or downstream 114 from the network controller 104. An upstream 112 position is considered on the front-end of the network controller 104 while the downstream 114 position is considered on the back-end of the network controller 104.

Relative to the group of data storage units 102, the data paths positioned downstream 114 of the network controller 104 are actually upstream and on the front-end of each data storage unit 102 while data paths between the respective data storage units 102, as shown by segmented arrows 116, are downstream and on the back-end of the data storage units 102. Hence, the terms front-end and back-end are meant to designate relative position.

For instance, the network controller 104 can have different numbers of channels, data paths, and bandwidth on the front-end (112) compared to the back-end (114). Likewise, the front-end (114) of the plurality of data storage units 102 can be differently configured and have different performance characteristics than the back-end (116). With differing performance characteristics, such as bandwidth, and access speed, on opposite sides of the network controller 104 as well as the data storage units 102, bottlenecks in data flow occur.

Figure 2:
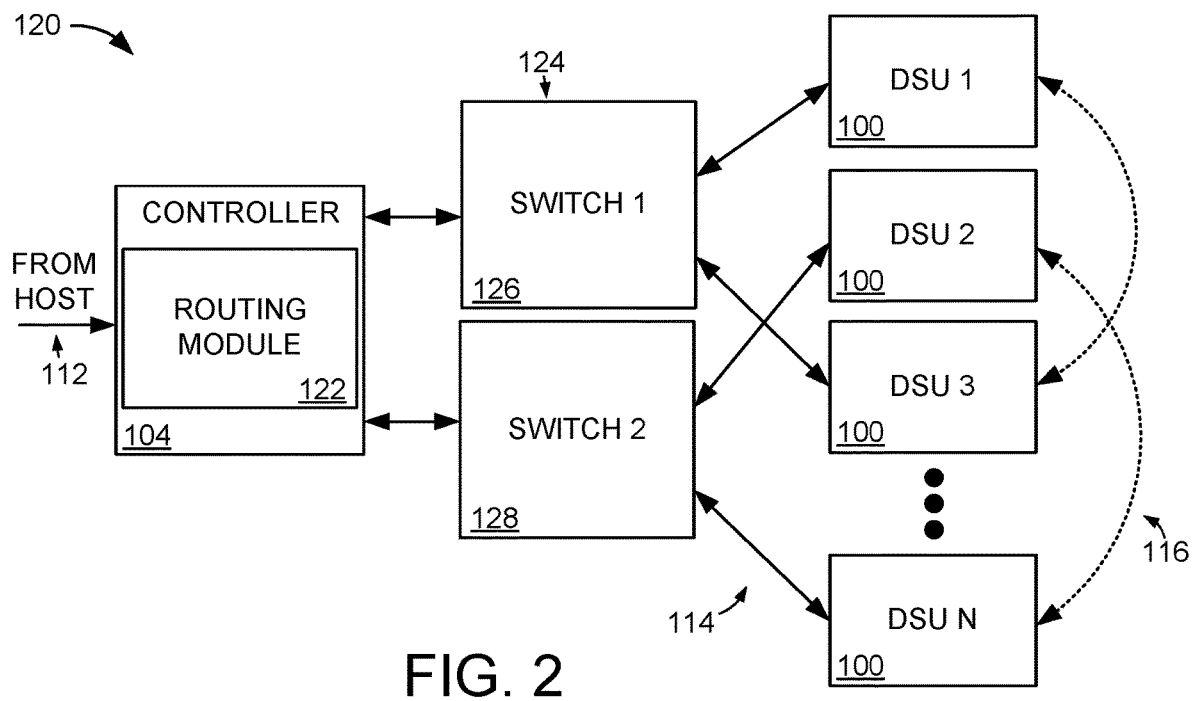
FIG. 2 displays a block representation of a portion of an example data storage system configured in accordance with some embodiments.

FIG. 2 conveys a block representation of a portion of an example data storage system 120 arranged in accordance with some embodiments. As directed by a data routing module 122 of the network controller 104, data traffic passes through a routing means 124, such as, but not limited to, the first 126 or second 128 data switches shown in FIG. 2, positioned on the back-end of the network controller 104 and on the front-end of the data storage units 102.

The routing means 124 can be any multi-channel circuit capable of sending data to a selected one, or more, data storage units 102. It is contemplated that the routing means 124 can consist of a router, switch, multiplexer, or wireless broadcast circuitry that can distribute data to a single data storage unit 102 or to more than one data storage unit 102 concurrently. For example, a routing means 124 can sequentially or simultaneously distribute a data access request to more than one data storage unit 102, but less than all the available data storage units 102 (N).

The addition of the routing means 124 and routing module 122 can provide more sophisticated data access requests, such as with parity bytes associated with various RAID levels. However, the use of routing means 124 and powerful computing in the routing module 122 cannot overcome the limited number of data paths available on the front-end (114) of the data storage units 102. That is, routing means 124 can intelligently use a physically limited number of data path channels between the network controller 104 and the data storage units 102, but cannot increase bandwidth of those data path channels, which creates a data access bottleneck when the number of data access requests is more than the available number of front-end data path channels. Such bottleneck is exacerbated by RAID operations where data redundancy and/or parity compound a response to a data access request.

It is noted that the routing module 122 can selectively utilize one or more back-end (116) data paths in combination with the primary data paths located on the front-end (114) of the data storage units 102. The physical characteristics of the back-end data path(s) (116) have a latency relative to the primary front-end data paths (114). Thus, the routing module 122 often utilizes the back-end data paths (116) when a pending, unsatisfied and unexecuted, number or size of data access requests are pending. That is, the routing module 122 does not send data to a data storage unit 102 via the back-end data path(s) (116) unless a threshold number, or size, of data accesses are pending at or upstream of the network controller 104.

Figure 3:
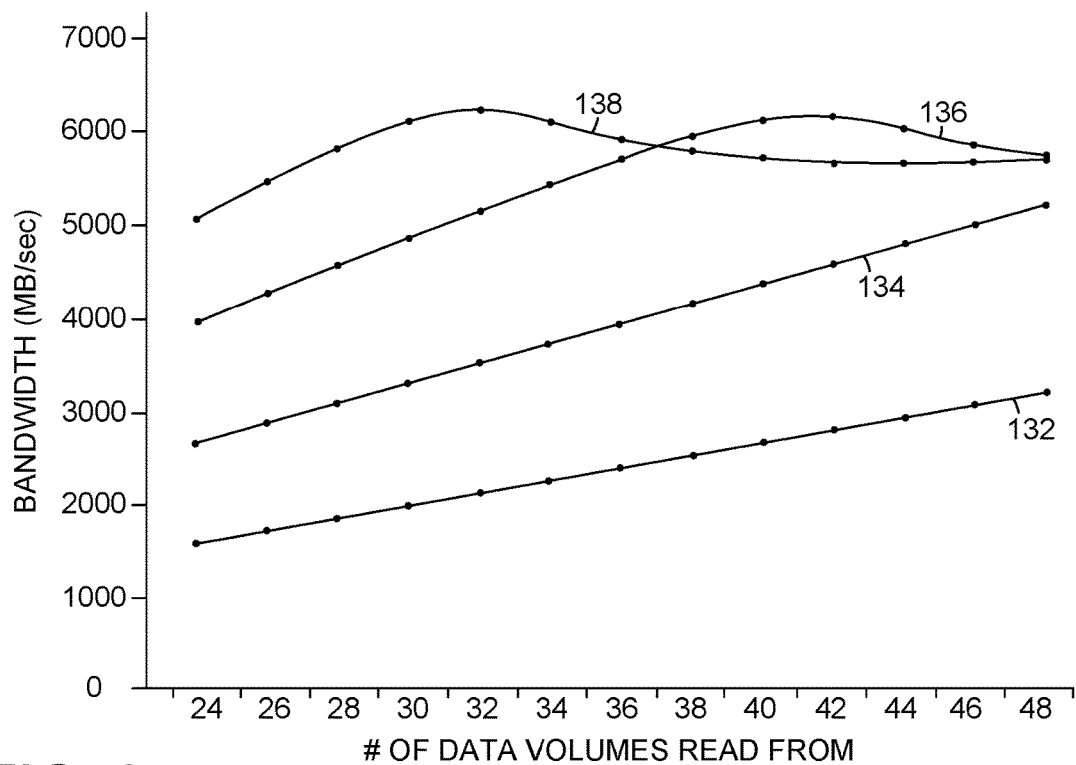
FIG. 3 plots example operational data corresponding to the data storage system of FIG. 1.

FIG. 3 plots operational data for an example data storage system, such as system 120 of FIG. 2. The utilization of data storage unit 102 back-end data path(s) (116) only when a predetermined number, or size, of data requests are pending results in a bottleneck in data bandwidth for the data storage system. Line 132 conveys the bandwidth of the data storage system in MB/sec for different numbers of data volumes being read from with a data size of 512 blocks. Line 134 represents the system bandwidth for various data volumes with a data size of 1024 blocks.

The system bandwidth associated with a data size of 2048 blocks is shown by line 136 while bandwidth for a data size of 3872 blocks is provided by line 138. It can be appreciated that for relatively small data sizes (512/1024), as shown in lines 132 and 134, a linear bandwidth profile is experienced for greater numbers of data volumes being read from. However, relatively large data sizes (2048/3872) experience a drop in system bandwidth with larger numbers of volumes being read from. Such bandwidth drops illustrate the data flow bottleneck created by crudely utilizing primary (front-end) data paths exclusively until a threshold number, or size, of data accesses are pending, at which time back-end data paths are all activated without regard for effect on the overall system bandwidth or data access speed.

Figure 4:
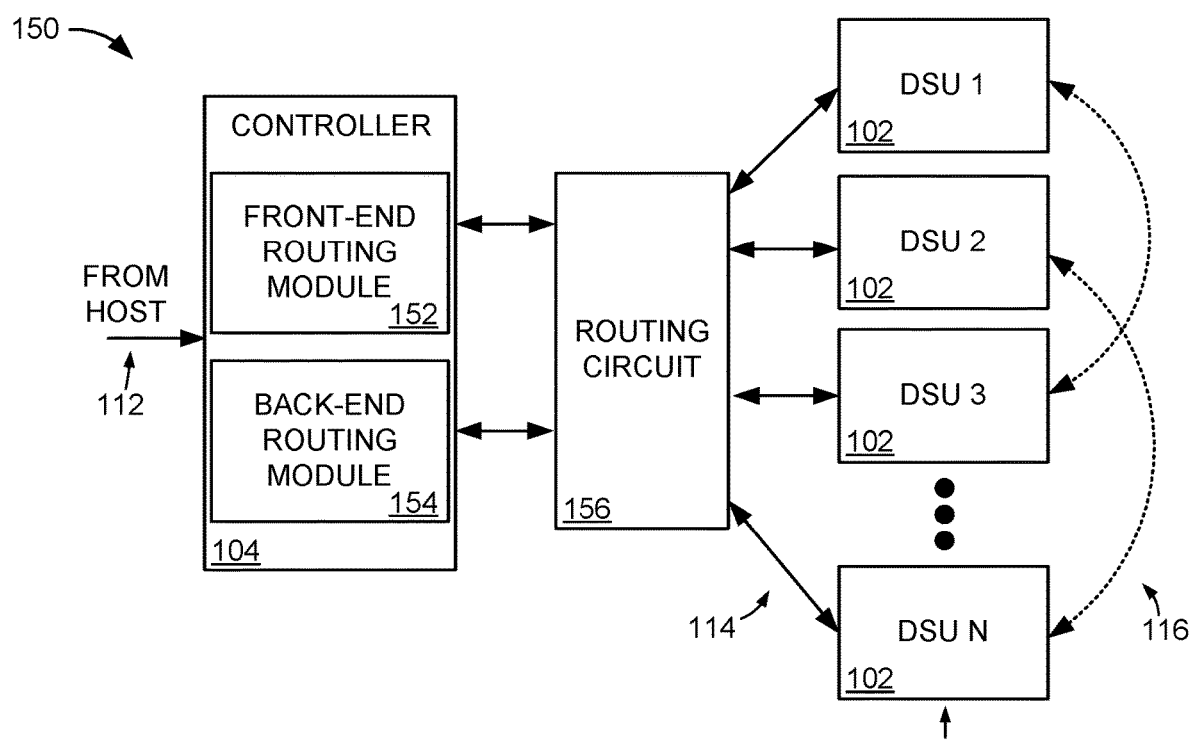
FIG. 4 illustrates a block representation of a portion of an example data storage system arranged in accordance with various embodiments.

Accordingly, assorted embodiments are directed to intelligent data routing in a network connected data storage system, such as the system 100 of FIG. 1. FIG. 4 displays a block representation of a portion of an example data storage system 150 where the network controller 104 is arranged with front-end 152 and back-end 154 routing modules that respectively direct traffic to optimize the flow of data in the system 150. As shown, the data storage system 150 sends data to, and from, the various data storage units 102 via a routing circuit 156, which may consist of any number of similar, or dissimilar, types of multi-channel data path selection means.

In contrast to the routing module 122 of FIG. 2 that generally used a primary (front-end) data path until enough pending data access requests triggered activation of all alternate data paths (back-end), the front-end routing module 152 employs one or more primary data paths from the front-end 114 of the data storage units 102 while the back-end routing module 154 continuously, sporadically, or routinely monitors the number of active storage units 102 in the collective plurality of data storage units 158. That is, the back-end routing module 154 can monitor the number of active units 102 and at any time activate one or more back-end data paths 116 to maintain, or increase, system bandwidth and data access performance.

In some embodiments, the back-end routing module 154 can activate other, alternate data paths besides the back-end data paths 116 to optimize system operation. As a non-limiting example, the back-end routing module 154 may direct data through an unused front-end data path 114 in conjunction with one or more back-end data paths 116 depending on the number of active data storage units 102. Another embodiment has the back-end routing module 154 employing multiple different types of data paths to optimize system performance, such as a unit-to-unit back-end data path 116, as shown by segmented lines, along with a switched front-end data path 114 that is created by the back-end routing module 154.

The ability to create and adjust data paths allows the back-end routing module 154 to provide alternate data paths that can take advantage of the number of active units 102 to reduce the number of pending data access requests in the network controller 104. However, it is noted that the back-end routing module 154 uses a logic, in various embodiments, to evaluate what alternate/back-end data paths will help maintain and/or optimize system performance In other words, the back-end routing module 154 does not simply trigger data paths once a threshold is met, but instead activates at least one back-end data path 116 with the number of active drives in consideration along with the prediction of how a variety of different data paths could improve the bandwidth and data access speed of the system 150.

Figure 5:
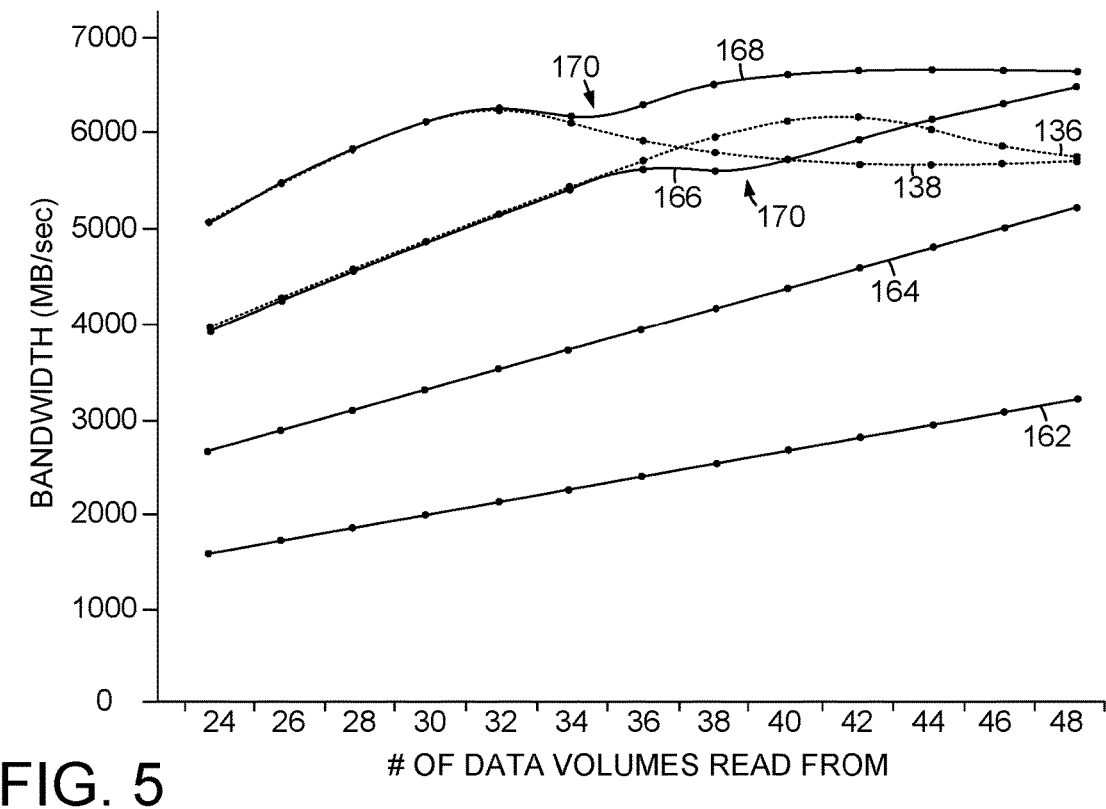
FIG. 5 graphs example operational data for a data storage system constructed and operated in accordance with assorted embodiments.

FIG. 5 graphs example data storage system operation where a back-end routing module is employed, such as system 150 of FIG. 4. The data is plotted as bandwidth (MB/sec) versus the number of data volumes read from for various data block sizes. With a 512 or 1024 block size, as shown in solid lines 162 and 164, a linear progression is experienced with increasing numbers of data volumes, much like lines 132 and 134 of FIG. 3.

For clarity line 166 represents a 2048 data block size and line 168 corresponds to a 3872 data block size. The comparison of segmented lines 136 and 138 to solid lines 166 and 168 conveys how the judicious and intelligent use of a back-end routing module mitigates the effects of relatively large numbers of pending data access requests. In fact, the back-end routing module provides reversals 170 in bandwidth trend by intelligently activating back-end/alternate data paths.

Figure 6:
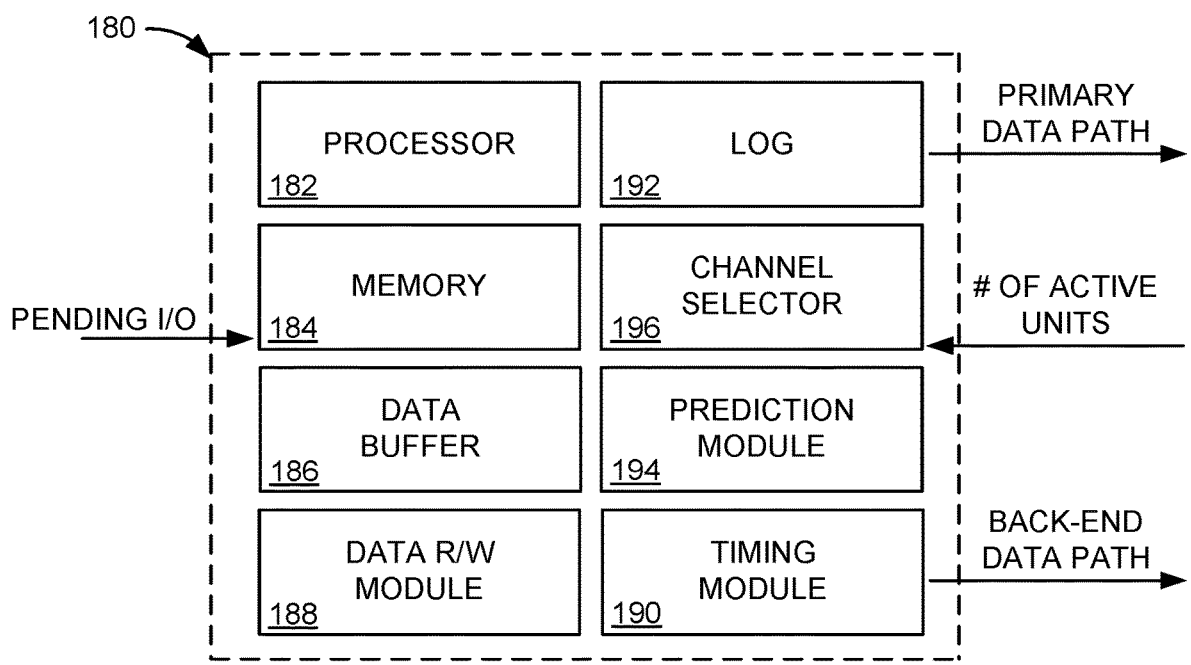
FIG. 6 shows an example network controller that can be utilized in the data storage system 100 of FIG. 1.

While various embodiments provide a back-end routing module as a local, or remote, component of a network controller, other embodiments can integrate front-end and back-end routing modules into a network controller circuitry without physical or electrical separation. As such, the network controller would have front-end and back-end routing capabilities without specifically separate, and perhaps redundant, computing modules. FIG. 6 illustrates an example network controller 180 that can be utilized in a data storage system to provide both front-end and back-end routing capabilities.

The controller 180 may have one or more local processors 182 that conduct assorted data transfer, generation, and elimination operations. The controller 180 can have a local non-volatile memory 184 that can store software, firmware, and other data pertinent to the execution of data distribution, and collection, in a network connected plurality of data storage units. The local memory 184 may be complemented by a local buffer 186 that may have a smaller capacity and data access latency compared to memory 184.

A read/write (R/W) module 188 can provide various preamp, security, encryption, and data maintenance services for data requests flowing into the controller 180 from one or more remote hosts. The processor 182 can employ a timing module 190 to provide the correct signal generation, and retrieval from one or more data storage units of the data storage system.

It is contemplated that the local processor 182 can concurrently, or sequentially, conduct the activities previously described for the front-end 152 and back-end 154 routing modules. The processor 182 can utilize a temporary, and/or permanent, log 192 to monitor the activities, operations, and performance of the system as a whole as well as of individual data storage units. The logging of system data can be used by a prediction module 194 to determine how the flow of data in assorted system data paths relate to overall system bandwidth and data access requests.

Regardless of whether the prediction module 194 or log 192 are utilized by the processor 182, the number of active data storage units is evaluated by the processor 182 to generate a data path selection that is carried out by at least one channel selector 196. It is noted that the channel selector 196 may trigger one or more separate routing means to activate a primary data path (front-end) and/or a back-end data path relative to the respective data storage units. By packaging the network controller 180 with the various circuitry, modules, and components shown in FIG. 6, the physical structure can be minimized while taking advantage of the sophisticated capabilities of modern printed circuitry.

Figure 7:
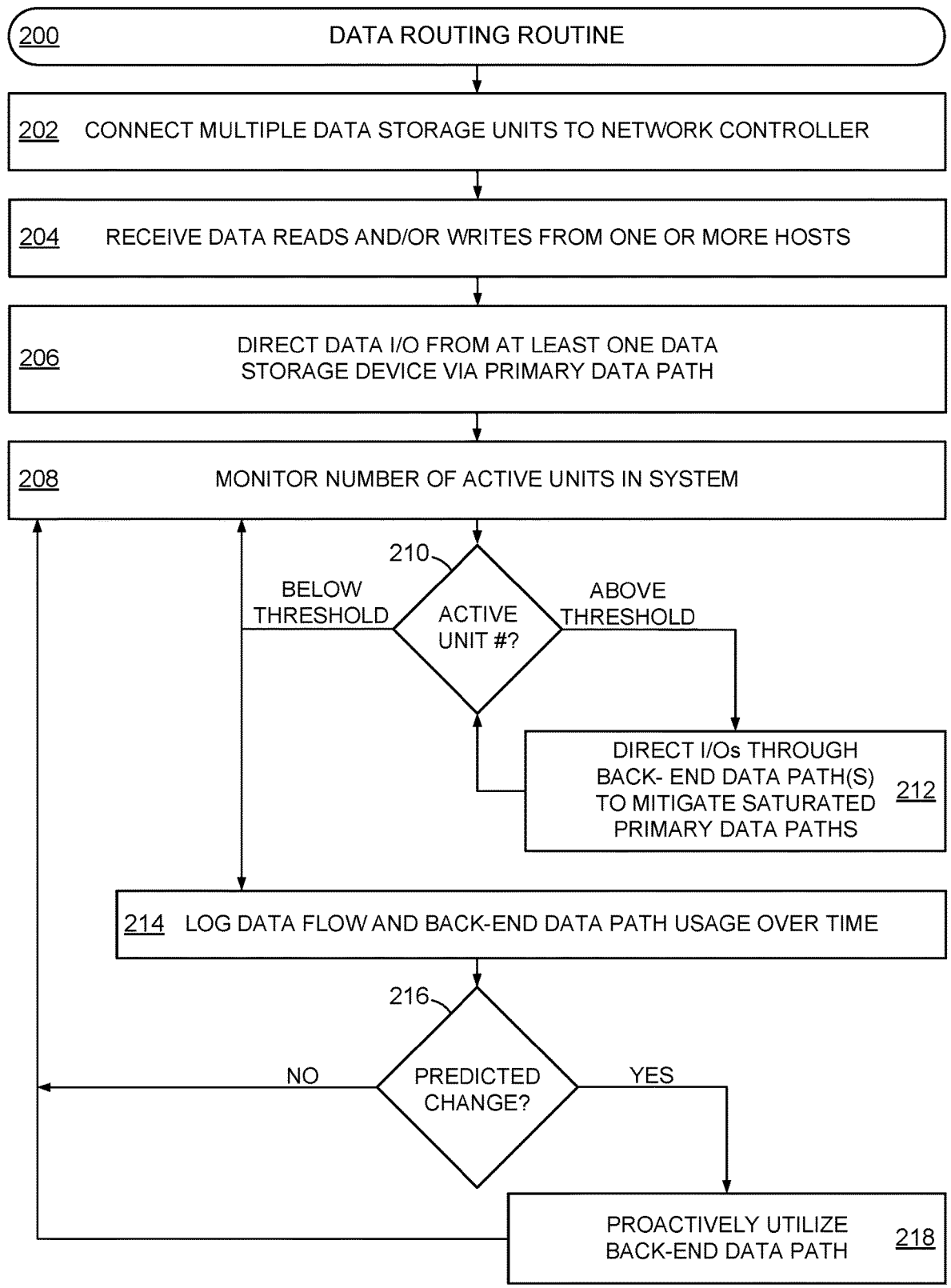
FIG. 7 provides a flowchart of an example data routing routine that can be carried out by the data storage system of FIG. 1.

As a result of configuring a network controller with front-end and back-end data routing capabilities, whether as a product of separate modules (FIG. 4) or integrated circuitry (FIG. 6), a data storage system can enjoy sophisticated data traffic management that can adapt to changing conditions to provide maintained, or increased, system bandwidth and data access request satisfaction speeds. FIG. 7 is a flowchart of an example data routing routine 200 that employs a network controller configured with the front-end and back-end routing capabilities previously described.

The data routing routine 200 begins with step 202 connecting multiple data storage units to a network controller. It is contemplated that the data storage units and controller are arranged as a RAID system. The assorted data storage units may be connected to the network controller via one or more routing means, such as a switch or router. The network controller receives data access requests in step 204 from at least one remote host.

The requests received by the network controller are then executed in step 206 by directing the previously received data access requests to at least one data storage unit 204 where one or more data reads and/or data writes, which is known as data input/outputs (I/O). The satisfaction of the data I/O in step 206 occurs with the transferring of data to, or from, the data storage unit(s) via one or more channels of the primary (front-end) data path. Step 206 can occur, in some embodiments, with no back-end data path being active.

Step 208 monitors the number of active data storage units that are activated during step 206 or as a result of any other operation that occupies at least a portion of a data storage unit, such as data maintenance like garbage collection. It is noted that step 208 may be conducted by a back-end routing module portion of the network controller or by the network controller in conjunction with executing the data I/O of step 206.

The number of active data storage units can be continuously or sporadically evaluated in decision 210 against one or more thresholds to determine the extent of utilization of new, or previously available, back-end/alternate data paths. Decision 210 can also evaluate any number of other system factors, such as number of pending I/Os in the network controller, number of connected remote hosts, and average data request size. If the number of active units, along with any other evaluated parameters, are below a predetermined threshold, the routine 200 returns to step 208 where data I/O are monitored.

In the event decision 210 determines that system parameters can be improved by utilizing back-end data paths, step 212 directs one or more data I/Os pending in the network controller through at least one back-end data path to mitigate the saturation of the various channels of the primary data paths. Step 212 may employ existing back-end data paths and/or create new alternate pathways that can involve passing data through one or more front-end channels. As a result of step 212, the number of active data storage units and pending data access requests will diminish and decision 210 will identify that system parameters are no longer conducive to the use of back-end or alternate data paths.

While step 212 may adapt to the encountered system conditions, such as bandwidth, number of active units, size of pending I/Os, and average time to satisfy a data access request, step 212 may also operate in a throttled schedule according to a predetermined routing schedule stored in the network controller. For example, but in no way required or limiting, decision 210 and step 212 can function according to Table 1:

TABLE 1

| # of Active Units | Primary Path I/Os | Back-end I/Os | Hysteresis Value |
|---|---|---|---|
| 0 | All | 0 | 0 |
| 35 | 16 | 2 | 0 |
| 38 | 10 | 3 | 2 |
| 42 | 10 | 4 | 2 |

It can be appreciated that operation according to Table 1 provides gradual ramping up, or down, of the utilization of back-end data paths according to the number of active data storage units. Unnecessary thrashing between primary and back-end data paths is mitigated by the hysteresis value that is incorporated into some, but not all, utilizations of one or more back-end data paths.

Regardless of the evaluation parameters of decision 210 and back-end data path utilization of step 212, step 214 logs data access request flow along with the use of back-end data paths over time. The logging of data flow in step 214 may be stored locally in the network controller and/or remotely in a host or connected network node. The logged system parameters from step 214 can be used by the network controller to adapt to changing system conditions, such as the addition or subtraction of the overall number of connected data storage units. Logged data may further allow the network controller to alter a routing schedule, such as Table 1, to provide different prescribed usage of back-end I/O.

Through the evolution of the system parameters that trigger step 212 from decision 210 based on the data flow logged in step 214, the data storage system can accommodate changing system conditions and different performance metric demands from a host, such as greater data bandwidth or faster data access speeds. In some embodiments, the logged data flow from step 214 is evaluated by the network controller, such as the prediction module 194, to predict one or more different system performance outcomes over time, such as the bandwidth for different data volumes plotted in FIGS. 3 & 5.

The network controller can predict possible future system outcomes continuously, upon demand, or upon detection of an event, such as a change in number of connected data storage units. Routine 200 evaluates one or more future predictions and determines if a change in system performance is likely to happen. For instance, if a predicted change in performance is deemed minimal by the network controller, decision 216 can return to step 208 without making any proactive actions to prevent, or exacerbate, a predicted change.

If decision 216 discovers a predicted change that is deemed transformative by the network controller, step 218 then proactively utilizes one or more back-end data paths to fulfill pending and new data access requests. For instance, the proactive use of back-end data paths could temporarily diminish the potential system bandwidth, but can maintain a consistent bandwidth in the event large volumes/sizes of data access requests arrive at the network controller in a short period of time. It is noted that the proactive use of back-end data paths in step 218 corresponds with selectively using a data path that has reduced performance (bandwidth/speed) instead of a primary data path that has superior performance That is, proactive use directs data through secondary data paths instead of through primary data paths.

Through the monitoring of the number of active data storage units in a network connected data storage system, a network controller can more intelligently direct data access requests through primary and back-end data paths. By responding to data access requests according to the current capabilities of the system instead of the size or number of pending data access requests, the bottlenecks associated with pending data access requests and fully utilized primary data paths are eliminated. The ability to proactively adapt to potentially changing system configurations and performance capabilities by utilizing back-end data paths allows a data storage system to maintain strict data access request metrics despite more data access requests than primary data paths to fulfill them.

What is claimed is:

1. A system comprising a network controller connected to a plurality of data storage units each comprising a local controller and memory, a first data set directed from a first data storage unit of the plurality of data storage units via a primary data path as directed by a front-end routing module of the network controller, the network controller configured to adapt to an amount of data accesses by transferring a second data set from a second data storage unit of the plurality of data storage units via a back-end data path as directed by a back-end routing module of the network controller, the primary data path extending through a routing circuit to the first data storage unit, the back-end data path extending from the first data storage unit to the second data storage unit without passing through the routing circuit.

2. The system of claim 1, wherein the first and second data sets are respectively transferred along the primary and back-end data paths concurrently.

3. The system of claim 1, wherein the second data set is not transferred until the network controller predicts a decrease in system bandwidth.

4. The system of claim 1, wherein the second data set is not transferred until the network controller detects a decrease in system bandwidth.

5. The system of claim 1, wherein the back-end data path has a greater latency than the primary data path.

6. The system of claim 1, wherein the network controller throttles the size of the second data set to provide a threshold system bandwidth.

7. The system of claim 1, wherein the second data set consists of data requests pending in a buffer of the network controller.

8. The system of claim 7, wherein the network controller alters the size of the buffer as a result of the number of pending data requests.

9. The system of claim 1, wherein the first data set is transferred via a single channel of the primary data path.

10. A method comprising:
connecting a network controller to a plurality of data storage units each comprising a local controller and memory;
directing a first data set from a first data storage unit of the plurality of data storage units via a primary data path as directed by a front-end routing module of the network controller, the primary data path extending from the network controller to the first data storage unit via a routing circuit;
detecting a number of active data storage units in the plurality of data storage units with the network controller; and
transferring a second data set from a second data storage unit of the plurality of data storage units via a back-end data path as directed by a back-end routing module of the network controller in response to the detected number of active data storage units, the back-end data path extending from the first data storage unit to the second data storage unit without passing through the network controller or routing circuit.

11. The method of claim 10, wherein the network controller ignores a total size of pending data accesses and a total number of pending data accesses.

12. The method of claim 10, wherein the front-end routing module sends all data accesses to the plurality of data storage units via the primary data path while the detected number of active data storage units is below a predetermined first threshold.

13. The method of claim 12, wherein the back-end routing module is inactive until the detected number of active data storage units is above the predetermined first threshold.

14. The method of claim 12, wherein the back-end routing module selects data accesses from a buffer of the network controller to maintain a system data rate provided to at least one host.

15. The method of claim 12, wherein the back-end routing module utilizes a number of different back-end data paths based on a routing schedule maintained by the network controller.

16. The method of claim 15, wherein the routing schedule is altered by the network controller in response to logged system bandwidth.

17. The method of claim 10, wherein the network controller adjusts the routing schedule to accommodate for hysteresis.

18. An apparatus comprising a network controller connected to a plurality of data storage units each comprising a local controller and memory, the network controller comprising a front-end routing module and a back-end routing module respectively directing data to the plurality of data storage units via a primary data path and a separate back-end data path in response to a detected number of active data storage units in the plurality of data storage units, the back-end data path extending between data storage units of the plurality of data storage units without passing through the network controller.

19. The apparatus of claim 18, wherein the primary data path has a greater bandwidth than the back-end data path.

20. The apparatus of claim 18, wherein the primary data path is physically separated from the back-end data path, the primary data path passing through a multi-channel selector upstream of the plurality of data storage units, the back-end data path passing between data storage units of the plurality of data storage units.

\* \* \* \* \*